(12) United States Patent
Wu et al.

(10) Patent No.: US 8,731,064 B2
(45) Date of Patent: May 20, 2014

(54) POST-PROCESSING FOR DECODER COMPLEXITY SCALABILITY

(75) Inventors: Hsi-Jung Wu, San Jose, CA (US); Ionut Hristodorescu, San Jose, CA (US); Christian L. Duvivier, San Jose, CA (US); James Normile, Los Altos, CA (US); Jochen Christian Schmidt, Goleta, CA (US); Chris Yoochang Chung, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1973 days.

(21) Appl. No.: 11/530,810

(22) Filed: Sep. 11, 2006

(65) Prior Publication Data

US 2008/0063085 A1    Mar. 13, 2008

(51) Int. Cl.
*H04N 7/12*    (2006.01)
*H04N 7/50*    (2006.01)
*H04N 7/26*    (2006.01)

(52) U.S. Cl.
CPC ............. *H04N 7/50* (2013.01); *H04N 7/26335* (2013.01); *H04N 7/26707* (2013.01); *H04N 7/26946* (2013.01); *H04N 7/26244* (2013.01)
USPC ............ 375/240.25; 375/240.26; 375/240.27; 375/240.28; 375/240.29; 375/240.01

(58) Field of Classification Search
CPC . H04N 7/50; H04N 7/26335; H04N 7/26707; H04N 7/26946; H04N 7/26244; H04N 7/26058; H04N 7/26074; H04N 7/26202
USPC ....................................... 375/240.01–240.29
See application file for complete search history.

(56) References Cited

U.S. PATENT DOCUMENTS

| 5,294,983 | A  | * | 3/1994  | Ersoz et al. ................... 348/521 |
|-----------|----|---|---------|------------------------------------------|
| 6,112,017 | A  | * | 8/2000  | Wise ............................. 712/200 |
| 6,233,356 | B1 |   | 5/2001  | Haskell et al. |
| 6,483,875 | B1 | * | 11/2002 | Hasebe et al. ........... 375/240.15 |
| 6,704,360 | B2 |   | 3/2004  | Haskell et al. |
| 6,751,259 | B2 | * | 6/2004  | Zhang et al. ............. 375/240.26 |
| 6,788,347 | B1 | * | 9/2004  | Kim et al. ..................... 348/441 |
| 6,891,893 | B2 | * | 5/2005  | Sullivan et al. .......... 375/240.25 |
| 6,940,912 | B2 | * | 9/2005  | Sullivan et al. .......... 375/240.26 |
| 7,386,049 | B2 | * | 6/2008  | Garrido et al. ........... 375/240.15 |
| 7,869,505 | B2 | * | 1/2011  | Rodriguez et al. ....... 375/240.12 |
| 8,189,669 | B2 | * | 5/2012  | Nakaishi .................. 375/240.16 |
| 2004/0013193 | A1 | * | 1/2004 | Narita ...................... 375/240.01 |
| 2005/0062746 | A1 | * | 3/2005 | Kataoka et al. ............... 345/505 |
| 2007/0050299 | A1 | * | 3/2007 | Sumida et al. .................. 705/52 |
| 2008/0043845 | A1 | * | 2/2008 | Nakaishi .................. 375/240.16 |

* cited by examiner

*Primary Examiner* — Andy Rao
*Assistant Examiner* — Shan Elahi
(74) *Attorney, Agent, or Firm* — Kenyon & Kenyon LLP (57) ABSTRACT

Systems, apparatuses and methods whereby a base coded video signal is provided to a decoder having a set of post-processing stages. The base coded video signal can be decoded to produce a base decoded video signal. Post-processing of the base decoded video signal can be used to produce an enhanced quality video output signal. Application of a post-processing stage can be implemented according to the capabilities of the decoder and/or the instantaneous operating parameters of the decoder and/or characteristics of a display. A control signal, communicated over a dedicated channel separate from the base coded video signal, can be used initiate and/or aid implementation of a post-processing stage. The control signal can also provide information to assist/manage the decoding of the base coded video signal. The use of additional post-processing stages increases the complexity of an overall decoding process while improving the quality of a resulting reproduced video sequence.

41 Claims, 7 Drawing Sheets

POST-PROCESSING FOR DECODER COMPLEXITY SCALABILITY

BACKGROUND OF THE INVENTION

1. Field of the Invention

The present invention generally relates to video encoding and decoding systems. More specifically, the present invention provides scalable decoding complexity based on optional application of post-processing stages to enhance decoding and display processes.

2. Background Art

Figure 1:
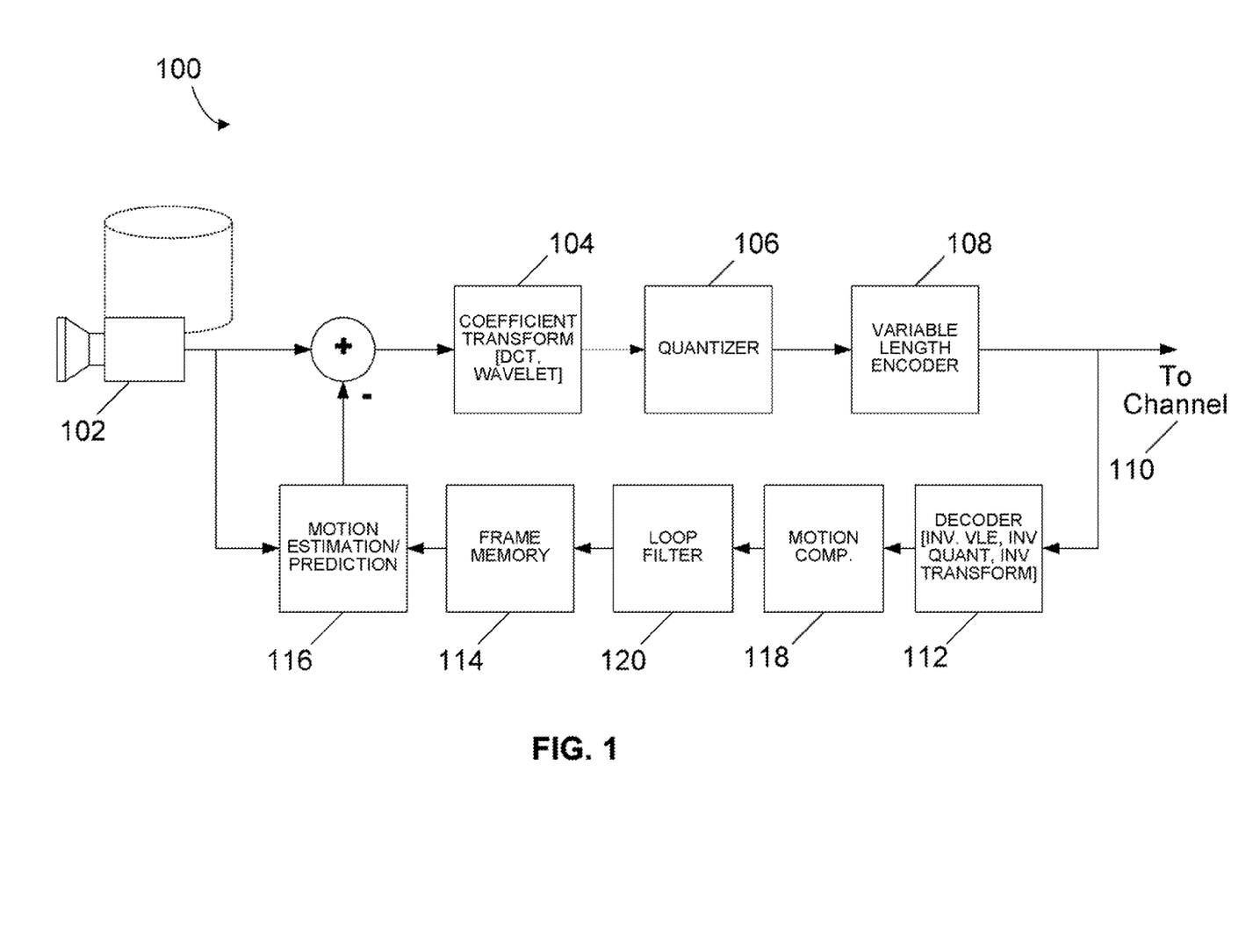
FIG. 1 is a functional block diagram of a conventional video encoder.

FIG. 1 is a functional block diagram of a conventional video encoder 100. The conventional video encoder 100 includes a video source device 102, a transform unit 104, a quantizer 106 a variable length encoder 108 and a motion estimation/prediction unit 116. The conventional video encoder 100 may accept data of a video sequence from the video source device 102, which may be, for example, either a video capture device or a storage device. Typically, image data of the video sequence is organized into frames, with each frame containing an array of pixels. The pixel data may be separated into luminance and a pair of chrominance components (e.g., Y, Cr, and Cb). The pixel data may be grouped together into pixelblocks or macroblocks.

The transform unit 104 transforms blocks of pixel data from a source frame to blocks of coefficient data according to a predetermined transform. For example, the transform unit 110 may operate according to a Discrete Cosine Transform (DCT). Conventionally, DCT coefficients are described as being a two-dimensional array of coefficients. The most common implementation is to convert an 8 pixel by 8 pixel block of source data to an 8×8 array of DCT coefficients. Alternatively, the transform unit 104 may operate according to a wavelet transform such that that the transform unit 104 produces wavelet coefficients based on input pixel block data. The pixel data received from the source 102 can be adjusted by the motion estimation/prediction unit 116 prior to transformation by the transform unit 104.

The quantizer 106 truncates coefficients output by the transform unit 104 by dividing them by a quantization parameter (qp). This reduces the magnitude of the coefficients that are used for subsequent coding operations. Some low level coefficients are truncated to zero. The quantization parameter may vary among blocks of a frame and among different frames. Thus, information regarding the quantization parameter itself may be included among the coded data output by the conventional video encoder 100 so that, during decode operations, the quantization parameter may be reconstructed and the quantization operation may be inverted.

The output of the quantizer 106 is passed to the variable length encoder 108. The variable length encoder 108 encodes the quantized coefficients and produces an encoded video bitstream for transmission over a communication channel 110. The communication channel 110 can be a real-time delivery system such as a communication network (e.g., a wireless communication network) or a computer network (e.g., the Internet). Alternatively, the communication channel 110 can be a storage medium (e.g., an electrical, optical or magnetic storage device) that can be physically distributed. Overall, the topology, architecture and protocol governing operation of the communication channel 110 are immaterial to the present discussion unless specifically identified herein.

The conventional video encoder 100 may further include a decoder unit 112, a motion compensation unit 118, a loopfilter 120 and a frame memory unit 114. These components can be used to store a decoded version of the encoded bitstream transmitted over the communication channel 110. Specifically, the decoder unit 112 includes an inverse variable length encoder (variable length decoder), an inverse quantizer and an inverse transform unit. The decoder unit 112 decodes the encoded video data output by the conventional video encoder 100. The output of the decoder 112 is provided to the motion compensation unit 118. The motion compensation unit 118 operates as an inverse motion estimation and compensation unit to reconstruct each frame of the original video sequence. The output of the motion compensation unit 118 is provided to the loopfilter 120. The loopfilter can operate as a deblocking filter 120 that can filter decoded macroblocks or pixelblocks to reduce blocking artifacts that are caused by the block structures resulting from the encoding scheme. The output of the loopfilter 120 can then be stored in the frame memory unit 114.

Figure 2:
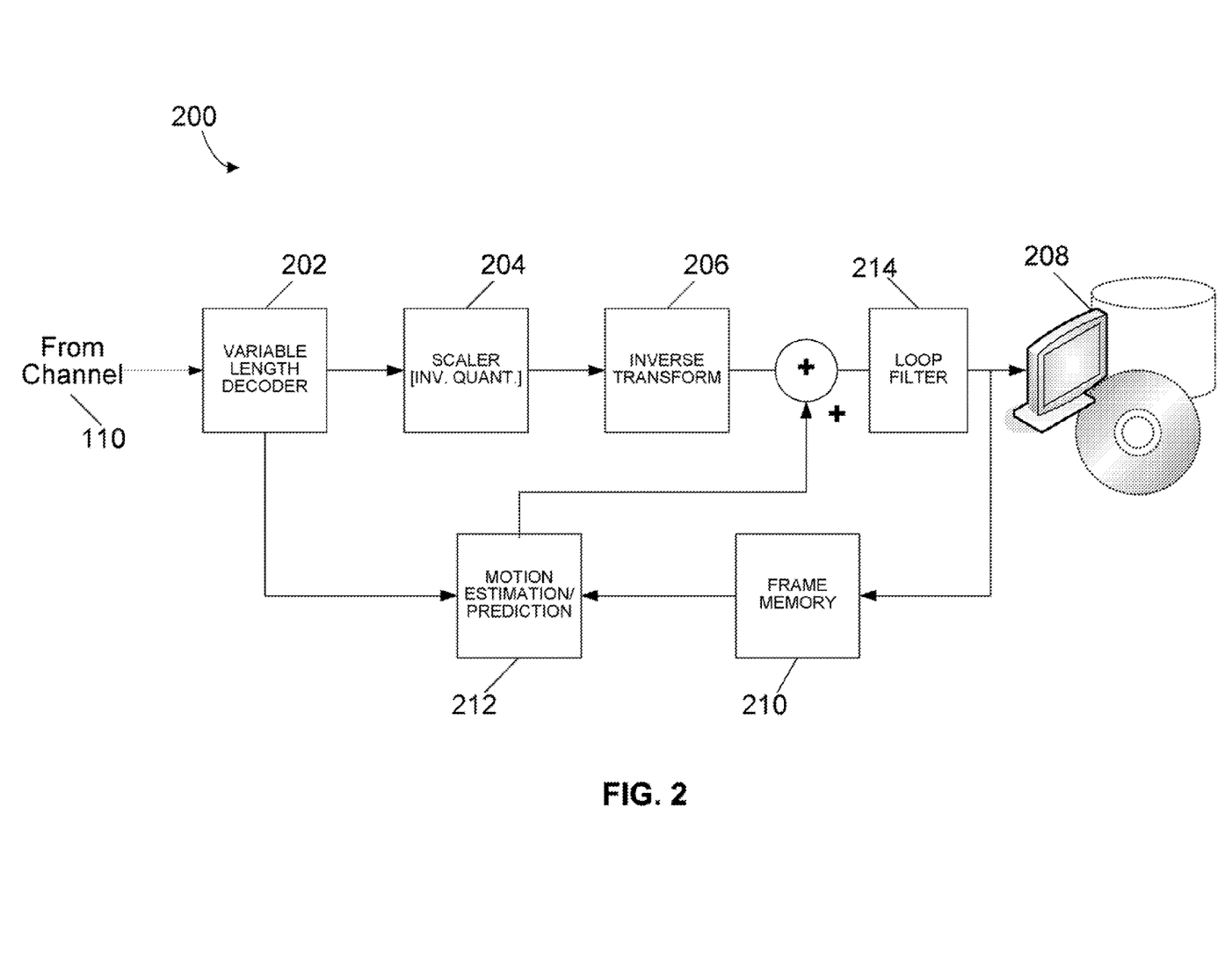
FIG. 2 is a functional block diagram of a conventional video decoder.

The motion estimation/prediction unit 116 can use the data stored in the flame memory unit 114, as well as input video sequence data from the video source device 102, to select portions of a frame for encoding. The motion estimation/prediction unit 116 can reduce the amount of video sequence data that needs to be encoded by comparing previously encoded frames and motion prediction information with current frame data. For example, the motion estimation/prediction unit 116 can be used to ensure that only the differences between successive input video frames are passed to the video encoding chain (i.e., the transform unit 104, the quantizer 106 and the variable length encoder 108) for encoding, FIG. 2 is a functional block diagram of a conventional video decoder 200. The conventional video decoder 200 includes a variable length decoder 202, a scaler unit 204, an inverse transform unit 206 and a loopfilter (e.g., deblocking filter) 214. The conventional video decoder 200 receives encoded video data from the communication channel 110. The conventional video decoder 200 operates in complement to the conventional video encoder 100 to reproduce the video data sequence encoded by the conventional video encoder 100.

The variable length decoder 202, the scaler unit 204 and the inverse transform unit 206 each perform inverse operations of the processes implemented by the variable length encoder 108f the quantizer 106 and the transform unit 104, respectively. The output of the inverse transform unit 206 can be provided to the loopfilter 214 for further processing. For example, the loopfilter 214 can operate as a deblocking filter to remove blocking artifacts that are caused by the block structures resulting from the encoding scheme. The output of the loopfilter 214 can be provided to a video sink device 208 which can be, for example, a video display device or a storage device.

The conventional video decoder 202 can also include a frame memory unit 210 and a motion estimation/prediction unit 212. The frame memory unit 210 can store a copy of the decoded video sequence output by the conventional video decoder 200. The motion estimation/prediction 212 unit can use data stored in the frame memory unit 210, as well as data from the variable length decoder 202, to modify data output by the inverse transform unit 206. Specifically, the motion estimation/prediction unit 212 can use data from previously decoded frames to adjust the decoding of a currently decoded frame.

The conventional video encoder 100 and the conventional video decoder 200 can be implemented in hardware, software or some combination thereof. For example, the conventional video encoder 100 and/or the conventional video decoder 200 can be implemented using a computer system. Further, the conventional video encoder 100 and the conventional video decoder 200 can implement a variety of video coding protocols such as, for example, any one of the Moving Picture Experts Group (MPEG) standards (e.g., MPEG-1, MPEG-2, or MPEG4) and/or the International Telecommunication Union (ITU) H.264 standard, Video data sequences are typically encoded once by an encoder and then received and decoded by several different decoders. Decoders can vary widely in terms of capabilities, features and processing power. For example, some feature-rich decoding devices may include enhanced memory capacity and memory bandwidth as well as increased processing/computational power in comparison to feature-poor decoding devices. Therefore, it is a challenge to encode video bitsreams in a way that can be efficiently exploited by a variety of decoders having a broad range of available processing resources and varying operational constraints. If the video sequence is encoded for feature-poor systems, then the encoded bitstream may not provide the data needed by a feature-rich decoder to take advantage of its enhanced capabilities. If the video sequence is encoded for feature-rich systems, then the encoded bitstream may be too complex and require too much work to be properly or efficiently decoded by a feature-poor device.

Furthermore, many encoder-decoder systems include many embedded complex stages that must all be invoked to produce pixel-accurate results. Thus, if all stages are not invoked then the resulting decoded video sequence will include errors. This all-or-nothing dependency among the embedded stages can improve compression of the encoded video sequence but comes at the expense of providing scalability at the decoder.

Accordingly, what is needed is the provision of an encoded video bitstream that can be properly and efficiently processed by decoders having a broad range of diverse capabilities by providing scalable complexity at each decoder. In particular, adjusting the complexity of decoding processes should account for the capabilities of the decoder and the state of the decoder at the time of decoding such that the decoder can specifically tailor the decoding process in accordance with received data and control information. Further, scaling the complexity of the decoding process should account for the characteristics of a display that may be used to present the decoded video sequence.

BRIEF DESCRIPTION OF THE DRAWINGS

The accompanying drawings illustrate the present invention and, together with the description, further serve to explain the principles of the invention and to enable one skilled in the pertinent art to make and use the invention.

DETAILED DESCRIPTION OF THE INVENTION

Embodiments of the present invention provide systems, apparatuses and methods by which a base coded video signal is provided to a decoder for preliminary decoding and optional additional processing to improve a quality of the initial decoded signal. Optional processing can be facilitated using a set of post-processing stages whose application can account for the resource capabilities and operating parameters of the decoder, as well as the characteristics of a display that may be used to present the decoded video data to achieve a desired video output quality. The selection and application of post-processing stages can be controlled using received control information. Control data can be communicated contemporaneously with the base coded video signal on a separate, dedicated channel A decoder can chose to ignore the received control data and can decode the base coded video signal without any post-processing to produce a base decoded video signal. Selectable application of post-processing functions, however, can be administered to provide a decoding complexity-resulting video signal quality tradeoff. That is, post-processing functions can be invoked to improve resulting decoded signal quality but can require additional processing expense. As a result, the complexity of the decoding process can be scaled and tailored to the characteristics and preferences of a specific decoder Further, decoding complexity is moved out of the main decoding loop into post-processing stages that can be selectively applied to improve quality without propagating errors due to decoder/encoder drift.

Figure 3:
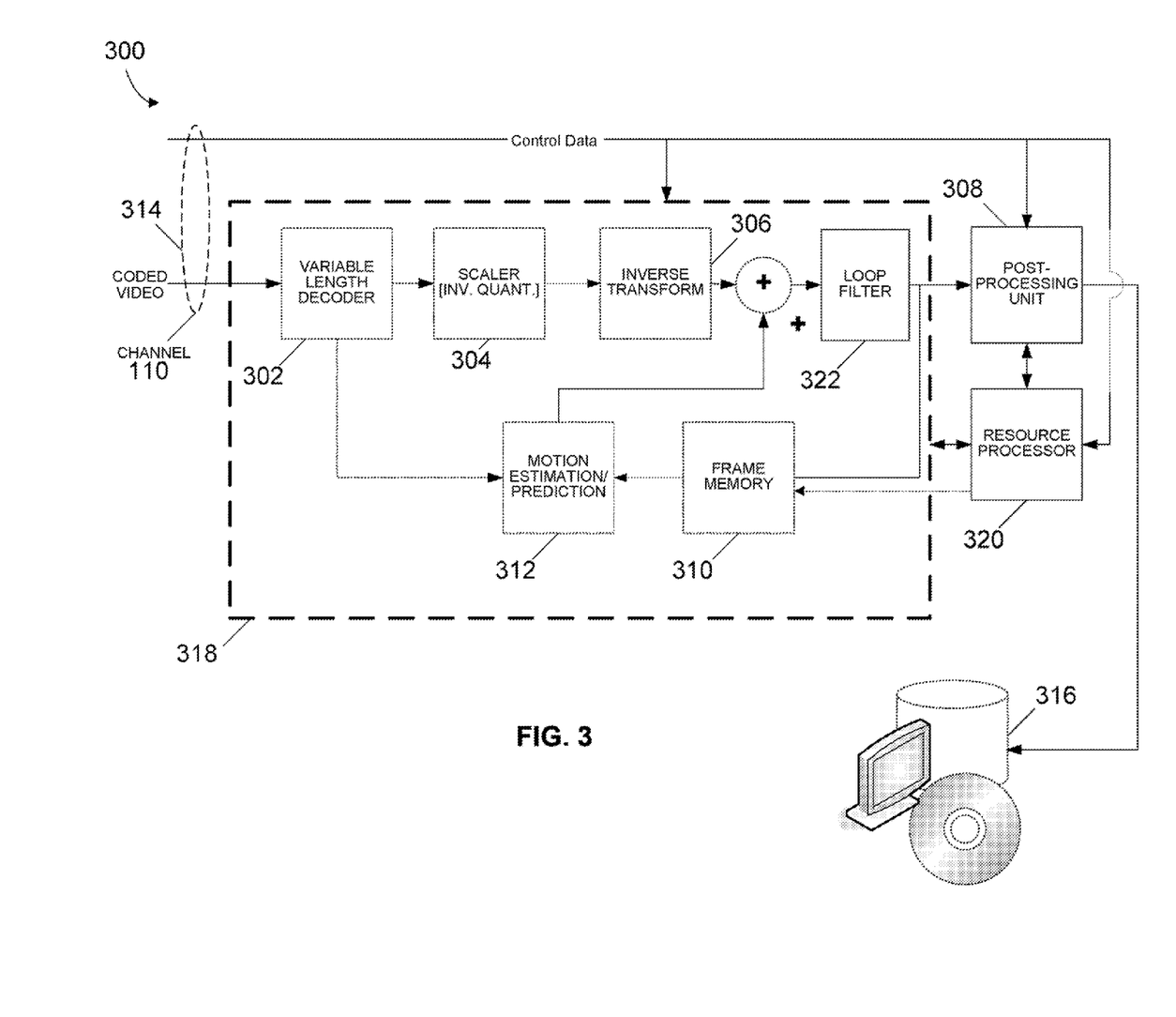
FIG. 3 is a functional block diagram of a decoder according to an embodiment of the present invention.

FIG. 3 is a functional block diagram of a decoder 300 according to an embodiment of the present invention. The decoder 300 can include a base decoding unit 318, a post-processing unit 308 and a resource processor 320. The output of the post-processing unit 308 can be provided to a video sink device 316. The base decoding unit 318 can be a feature-rich or a feature-poor decoder or can operate as a decoder well known in the art. An advantage of the present invention is based on the use of the post-processing unit 308 to supplement the decoding process implemented by the base decoding unit 318. Specifically, the base decoding unit 318 can decode a received coded video signal to generate a base decoded signal. The base decoded signal can then be further processed by the post-processing unit 308 to produce an enhanced or higher quality output signal.

Various processing functions can be implemented by the post-processing unit 308 and each can be applied selectively to the overall decoding process in a way that enables the decoding process to be scalable. Decoding complexity, in terms of the number type (e.g., algorithm selection) and extent (e.g., number of operations) of post-processing functions implemented by the post-processing unit 308, can be appropriately adjusted based on factors such as the complexity of the received encoded signal and the capabilities and instantaneous operating parameters of the decoder 300. Decoding complexity can also be adjusted based on the characteristics of a display that may be used to present the decoded video data. Further, decoding complexity of the post-processing unit 308 can be adjusted based on the decoding capabilities of the base decoding unit 318, as managed by the resource processor 320. In doing so, the overall decoding complexity of the decoder 300 is managed by the resource processor 320 by adjusting performance/operation of the base decoding unit 318 in conjunction with the post-processing unit 308. As a result, a received coded video signal can be generated at a corresponding encoder that can be tailored to the capabilities of the decoder 300 such that an adjustable increase in decoding complexity translates into an improved output signal quality and/or decoding efficiency.

The resource processor 320 can monitor the status, capabilities and/or instantaneous operating parameters of the decoder 300 during a decoding process. The resource processor 320 can control the behavior and operation of the post-processing unit 308 and the base decoding unit 318 to provide optimal visual quality given the resources available across the entire decoder 300. If the decoder 300 is subject to strict power or processing requirements, then the resource processor 320 can appropriately determine what post-processing functions should be implemented by the post-processing unit. For example, if the decoder 300 has limited remaining battery power, the resource processor 320 can limit the amount of post-processing conducted. On the other hand, if the decoder 300 faces little or no power or processing limitations, then the resource processor 320 can specify or allow the implementation of more extensive post-processing functions by the post-processing unit 308.

Under either scenario the decoding operations performed by the base decoding unit 318 can also be adjusted by the resource processor 320. For example, the resource processor 320 can decide to downgrade the number of operations applied in the loopfilter 322 and to alternatively apply a lightweight post-processing deblocking filter in the post-processing unit 308 to maintain a desired visual quality. In another example, the resource processor 320 can decide to have the base decoding unit 318 decode frames down to a low resolution and to appropriately resize the frame using a resolution filter or process included in the post-processing unit 308. The resource processor 320 could also decide to have the base decoding unit 318 decode less than all the available frames in the received encoded bitstream and to upsample the resulting reduced frame rate with an interpolation filter or process included in the post-processing unit 308.

Management of the decoding operations performed by the base decoding unit 318 and the post-processing unit 308 can be adjusted based on the capabilities and characteristics of the sink 316 (e.g., a video display). For example, if a low quality display will be used to present the video sequence decoded by the decoder 300, then the resource processor 320 can suitably adjust the decoding operations performed by the base decoding unit 318 and the post-processing unit 308. This may lead to the decoding complexity of the decoder 300 being appropriately scaled back since providing a tower quality output signal is sufficient. On the other hand, if a high quality display will be used to present the video sequence decoded by the decoder 300, then the resource processor 320 can suitably increase the decoding complexity of the decoder 300 to generate a higher quality output signal. In both instances, the decoding complexity of the overall decoder 300 can be adjusted by managing the operations of the base decoding unit 318 in conjunction with those to be performed by the post-processing unit 308

As previously mentioned, a large variety of decoders can be used as the base decoding unit 318. The base decoding unit 318 can be a synchronous decoder. In an embodiment, the base decoding unit 318 can include a variable length decoder 302, a scaler unit 304, an inverse transform unit 306, a frame memory unit 310, a prediction unit 312 and a loopfilter (e.g., a deblocking filter) 322. This primary decoding stage can include additional (or substitute) decoding processes including, for example, run length decoding processes. Because advantages of the present invention can be realized without limiting the base decoding unit 318 to a specific set of decoders, the constituent components of the base decoding unit 318 are shown in phantom. This is to further indicate that these components are not required and can be supplemented, replaced or reconfigured in accordance with the present invention.

The post-processing unit 308 can include one or more of post-processing stages that can be selectively activated or deactivated to increase or decrease the complexity of a current decoding process. The post-processing unit 308 can receive control data via a channel 314. The channel 314 can comprise (1) a primary encoded component that includes coded video data to be decoded and retained by the base decoding unit 318 and (2) control data to govern operation of the post-processing unit 308 and the base decoding unit 318. The control data can be communicated over a dedicated channel that is separate from the received coded video signal (e.g., out-of-band signaling). For example, the control data can be interleaved with the received coded video signal according to a known pattern or formatting scheme.

The base encoded bitstream is processed or decoded by the primary decoding stage of the decoder 300 and then provided to the post-processing unit 308. The post-processing unit 308 represents a secondary processing stage of the decoder 300 and can selectively adjust the complexity of the decoding process. Specifically, one or more additional post-processing functions can be implemented by the constituent components of the post-processing stage to enhance or improve the quality of the decoded bitstream provided to the video sink device 316.

Several post-processing functions or fitters, to be described in more detail below, can be included in the post-processing stage 308. The selection of which post-processing function to implement (as well as which algorithm to use) can be based on the received control data. The received control data can command the decoder to implement a specific post-processing function or can communicate to the decoder 300 that a specific post-processing function is possible. With the latter, the decision to implement the post-processing function can reside with the decoder 300 and can be based on factors such as the capabilities of the decoder 300 (as either a feature-rich or feature-poor device) and/or the power limitations of the decoder 300. The implementation of a certain post-processing function can also depend on the capabilities of a display that may present the decoded data output by the decoder 300.

The post-processing functions implemented by the post-processing filter 308 can be generally classified into two broad categories: enhancement and conversion. Enhancement processing includes functions such as deblocking, dithering, contrast enhancement and sharpening/edge enhancement. Conversion includes operations such as scan mode conversion, aspect ration conversion, spatial scaling and temporsal scaling.

The control data received by the decoder 300 can be ignored such that only the primary decoding stage of the decoder 300 processes the received coded video signal. In doing so, a base decoded video signal can be provided to the video sink device 316. As more post-processing stages are exploited to further process the video signal decoded by the primary decoding stage, the quality of the video signal provided to video sink device 316 can improve. The complexity of the decoding process implemented by the decoder 300 is scalable since the post-processing functions are selectable and do not adhere to an all-r-nothing implementation dependency. As a result, image quality can be enhanced or improved with the selectable discrete increase in complexity.

In general, the control data received by the decoder 300 can; (a) include data to aid the decoding processes implemented in the primary decoding stage of the decoder 300; (b) control and/or aid the implementation of a variety of post-processing functions implemented in the post-processing stage 308; and/or (c) otherwise improve decode image quality by providing additional data for decoding (e.g., an enhancement layer that can be combined with a decoded base coded video bitstream). The control data can be provided to the resource processor 320 to enable the resource processor 320 to make the decisions and/or implement the commands to adjust the decoding operations of the base decoding unit 318 and/or the post-processing unit 308 to achieve a desired visual quality given the resources available to the decoder 300. In an embodiment, the resource processor 320 can adjust the power consumption of the base decoding unit 318. For example, the resource processor 320 can adjust operation of the frame memory 310 to regulate the state of the base decoding unit 318. More detail on the control signaling provided to the decoder 300 is provided below.

The decoder 300 can include one or more post-processing functions implemented by components of the post-processing unit 308. More detail on some of these post-processing functions is provided below. The post-processing functions are well known in the art. However, advantages of the present invention over existing systems using such functions is the selective implementation of the post-processing functions, and appropriate adjustment of the base decoding functions, to provide scalable decoder complexity. Further, the post-processing functions are not susceptible to propagation errors caused by encoder-decoder drift.

Each of the post-processing stages described below can be implemented in hardware, software or some combination thereof. Further, the decoder 300 and any included post-processing stage can implement or otherwise operate in conjunction a variety of video coding protocols such as, for example, any one of the Moving Picture Experts Group (MPEG) standards (e.g., MPEG-1, MPEG-2, or MPEG-4) and/or the International Telecommunication Union (ITU) H.264 standard. Each of the post-processing stages described below can be implemented by itself or in combination with any other post-processing stage and can be implemented in any desired order. Each of the post-processing stages described below can also utilize an enhancement video layer or any enhancement data provided during implementation of a post-processing function.

Deblocking

Figure 4:
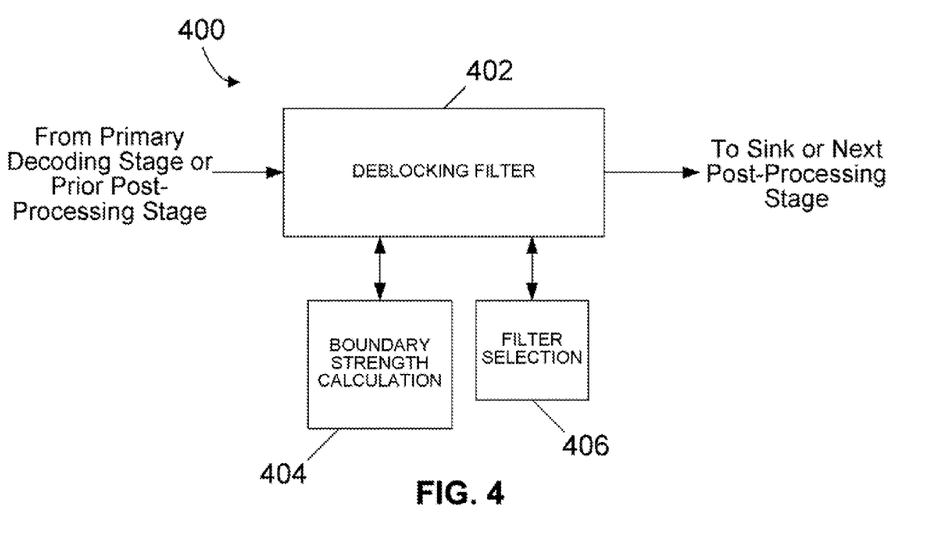
FIG. 4 is a functional block diagram of a deblocking stage according to an embodiment of the present invention.

The post-processing stage 308 can include a deblocking stage. In general, deblocking involves the filtering of decoded macroblocks or pixelblocks to reduce blocking artifacts that are caused by the block structures resulting from the encoding scheme. Implementation of deblocking filters and processes is well known in the art. FIG. 4 is a functional block diagram of a deblocking stage 400 according to an embodiment of the present invention. The deblocking stage 400 can include a deblocking filter 402, a boundary strength calculation unit 404 and a filter selection unit 406. The deblocking stage 400 receives decoded video data from either the primary decoding stage of the decoder 300 or a prior post-processing stage. The output of the deblocking stage 400 can be provided to the sink 316 or to a next post-processing stage. The constituent components of the deblocking stage 400 can each be in communication with the control data received by the decoder 300.

The deblocking filter 402 can be an adaptive deblocking filter, which can be applied to each decoded macroblock or pixelblock to reduce blocking artifacts that are caused by the block structures resulting from the encoding scheme. The deblocking filter 402 can be designed to smooth the blocking edges around the boundary of each macroblock or pixelblock without affecting the sharpness of the picture. In turn, the subjective quality of the decompressed video can be improved.

The deblocking filter 402 is applied to the vertical and horizontal edges of a pixelblock (e.g., 4×4 chroma or luma blocks of a macroblock or pixelblock). The amount of filtering is measured by a "boundary strength," which is determined by various factors well known in the art. Control data received by the deblocking stage 400 can turn the deblocking stage 400 on and off. The deblocking stage can be applied to a decoded frame or any portion thereof. Boundary strengths can be calculated on the fly using the boundary strength calculation unit 404 or can alternatively be supplied within the control data signaling. Boundary strength calculation can be real-time or can utilize a look-up table. Various adaptive filter configurations can be selected using the filter selection unit 406.

In an embodiment, the deblocking stage 400 can use the H.264 loopfilter typically used in the primary decoding stage of a H.264 decoder. That is, the H.264 loopfilter can be moved out of the primary decoding loop and reconfigured as a post-processing stage. The H.264 loopfilter can also be used on pixelblock edges corresponding to pixelblock boundaries or motion compensated block edges while a second, possibly less complex, filter can be applied to the remaining transform block edges. In a further embodiment, the boundary strengths can be nominally setup as if each filtered macroblock or pixelblock is an intra group of pixels, Consequently, a filtered group of pixels can be decoded such that filter effects do not pass frame to frame.

The deblocking stage 400 can also utilize an enhancement bitstream sent out-of-band to the decoder 300 such that the decoded out of-band pixels can be combined with the decoded in-band pixels for filtering.

Dithering

Figure 5:
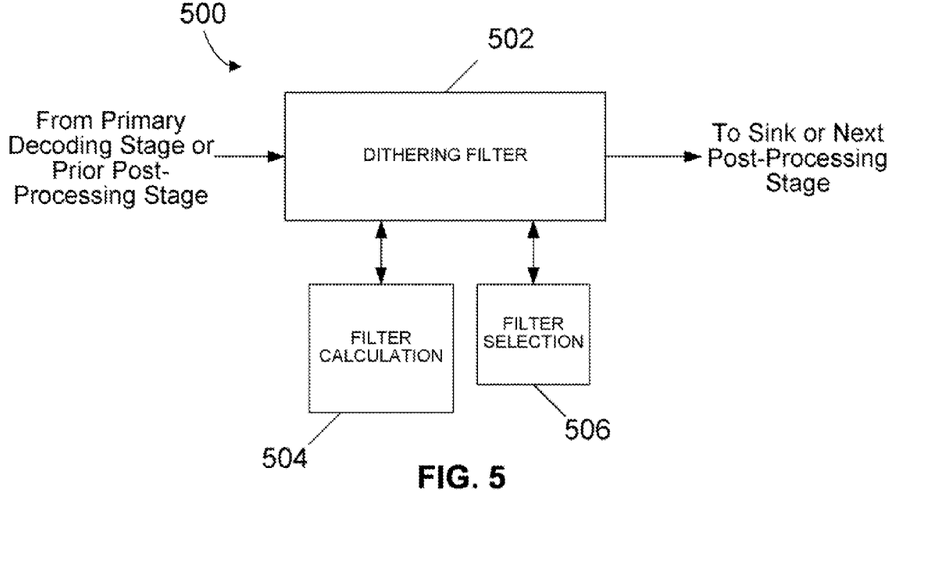
FIG. 5 is a functional block diagram of a dithering stage according to an embodiment of the present invention.

The post-processing stage 308 can include a dithering stage. In general, dithering typically involves the application of an often random noise signal to a data signal prior to a quantization process for purposes of minimizing or reducing quantization error. Implementation of dithering filters or processes is well known in the art. FIG. 5 is a functional block diagram of a dithering stage 500 according to an embodiment of the present invention. The dithering stage 500 can include a dithering filter 502, a dithering filter calculation unit 504 and a filter selection unit 506. The dithering stage 500 receives decoded video data from either the primary decoding stage of the decoder 300 or a prior post-processing stage. The output of the dithering stage 500 can be provided to the sink 316 or to a next post-processing stage. The constituent components of the dithering stage 500 can each be in communication with the control data received by the decoder 300.

The dithering stage 500 can be used to mitigate quantization noise inherent in the decoded bitstream received by the dithering stage 500. The dithering stage $00 can also be used to mitigate other noise introduced in processes downstream, Control data received by the dithering stage 500 can turn the dithering stage 500 on or off. The received control data can also specify the filter to be employed by the dithering stage 500. Data relating to a selected filter can be stored in the filter selection unit $06. The filter calculation unit 504 can be used to support the calculation or administration of a particular filter applied by the dithering filter 502. Each of the components of the dithering stage 500 can be controlled by received control data and/or aided by data received via the control or out-of-band signaling channel. The dithering filter 502 can be applied on a frame-by-frame basis or can be applied to any portion of a frame.

The dithering process implemented by the dithering stage 500 can be a zero-mean wide-spectrum noise signal applied to decoded pixels received by the dithering stage 500. The noise signal can also be specified, for example, in terms of spectral shape, by the received control data. In an embodiment, the spectral shape can be random for each frame. Further, the dithering process can also be a colored noise filter specified by the corresponding encoder and communicated via the out-of-band signaling. The dithering process can also implement an error diffusion filter.

Sharpening/Edge Enhancement

Figure 6:
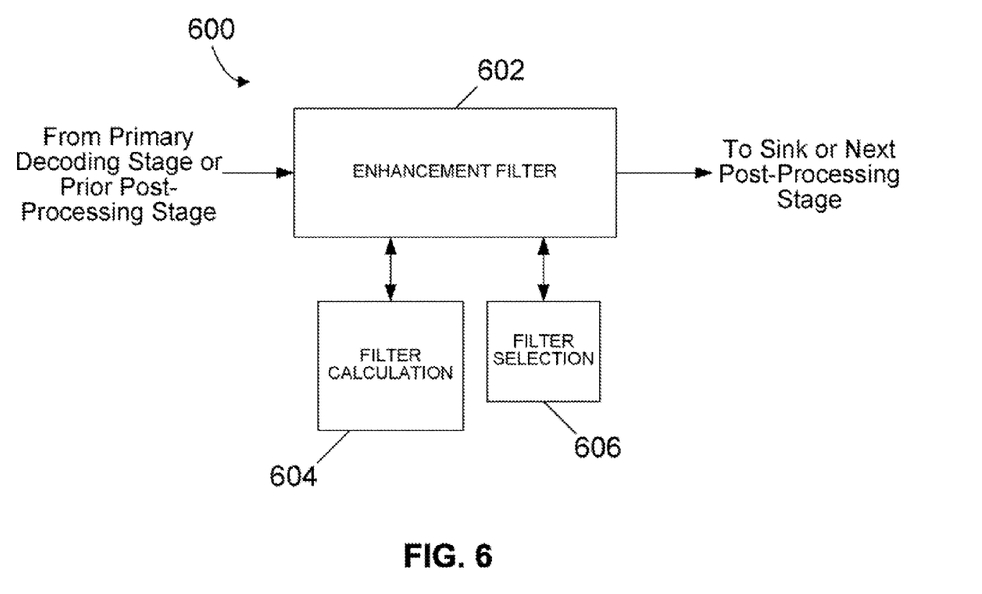
FIG. 6 is a functional block diagram of a sharpening/edge-enhancement stage according to an embodiment of the present invention.

The post-processing stage 308 can include a sharpening/edge-enhancement stage 600.

Sharpening or edge-enhancement filtering enables edges and texture to be added to decoded pixels that have been reduced or muted during the encoding process. The implementation of sharpening or edge-enhancement filters and processes is well known in the art. FIG. 6 is a functional block diagram of a sharpening/edge-enhancement stage 600 according to an embodiment of the present invention. The sharpening/edge-enhancement stage 600 can include a sharpening/edge-enhancement filter 602, a filter calculation unit 604 and a filter selection unit 606. The sharpening/edge-enhancement stage 600 receives decoded video data from either the primary decoding stage of the decoder 300 or a prior post-processing stage. The output of the sharpening/edge-enhancement stage 600 can be provided to the sink 316 or to a next post-processing stage. The constituent components of the sharpening/edge-enhancement stage 600 can each be in communication with the control data received by the decoder 300.

As previously mentioned, the sharpening/edge-enhancement stage 600 enables edges and texture to be added to decoded pixels that have been reduced or muted during the encoding process. Control data received by the sharpening/edge-enhancement stage 600 can turn the sharpening/edge-enhancement stage 600 on or off The received control data can also specify the filter to be employed by the sharpening/edge-enhancement stage 600. Data relating to a selected filter can be stored in the filter selection unit 606. The filter calculation unit 604 can be used to support the calculation or administration of a particular filter applied by the enhancement filter 602. Each of the components of the sharpening/edge-enhancement stage 600 can be controlled by received control data and/or aided by data received via the control or out-of-band signaling channel. The enhancement filter 602 can be applied on a frame-by-frame basis or can be applied to any portion of a frame.

In an embodiment, the sharpening/edge-enhancement stage can implement a sharpening/edge-enhancement process that is an unsharp masking process. Further, the sharpening/edge-enhancement process can also utilize an enhancement bitstream sent out-of-band to the decoder 300 such that the decoded out of-band pixels can be combined with the decoded in-band pixels for filtering.

Spatial Scalability

Figure 7:
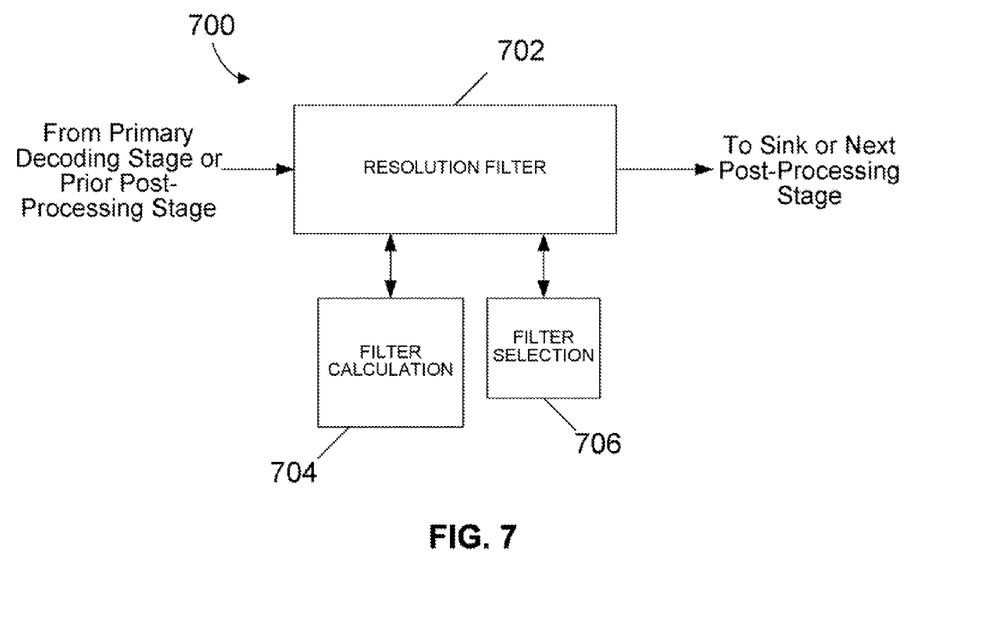
FIG. 7 is a functional block diagram of a spatial scalability stage according to an embodiment of the present invention.

The post-processing stage 308 can include a spatial scalability stage. Spatial scalability enables the resolution of a decoded frame to be enhanced typically by interpolation of pixels. Spatial scalability schemes are well known in the art. FIG. 7 is a functional block diagram of a spatial scalability stage 700 according to an embodiment of the present invention. The spatial scalability stage 700 can include an interpolation or resolution filter 702, a filter calculation unit 704 and a filter selection unit 706. The spatial scalability stage 700 receives decoded video data from either the primary decoding stage of the decoder 300 or a prior post-processing stage The output of the spatial scalability stage 700 can be provided to the sink 316 or to a next post-processing stage. The constituent components of the spatial scalability stage 700 can each be in communication with the control data received by the decoder 300.

The spatial salability stage 700 can be used to provide enhanced resolutions for decoders that have the capability to process higher resolution images. A spatial scalability process implemented by the spatial scalability stage 700 can involve interpolating the decoded pixels with a suitable filter. Possible filters include, but are not limited to, windowed sinc, bi-cubic and spline filters. In an embodiment, after resolution filtering, the interpolated pixels can be applied to a sharpening/edge-enhancement process (e.g., the sharpening/edge-enhancement process described above and depicted in FIG, 6).

The received control data can turn the spatial scalability process on or off. The control data can also specify a filter to be used, which may be stored in the filter selection unit 706. The calculation unit 704 may be invoked to calculate portions of a filter that may be applied to decoded pixels. The resolution filter 602 can be applied on a frame-by-frame basis or can be applied to any portion of a frame.

The resource processor 320 can adjust the decoding operations of the base decoding unit 318 such that the base decoding unit 318 outputs tow resolution frames. The resource processor 320 can make this adjustment by either by applying spatial scalabilituy inherent in the received encoded bitstream or by selectively decoding the received encoded bitstream. To account for this adjustment in the base decoding unit 318, the resource processor 320 can use the spatial scalability stage 700 to apply a resolution filter to upsample the decoded frames. As a result, a desired visual quality can be achieved.

The spatial-scalability stage 700 can be applied to any portion of a received frame.

Further, the spatial scalability stage 700 can also utilize an enhancement bitstream sent out-of-band to the decoder 300 to combine the decoded out of-band pixels with decoded in-band pixels for filtering.

Temporal Scalability

Figure 8:
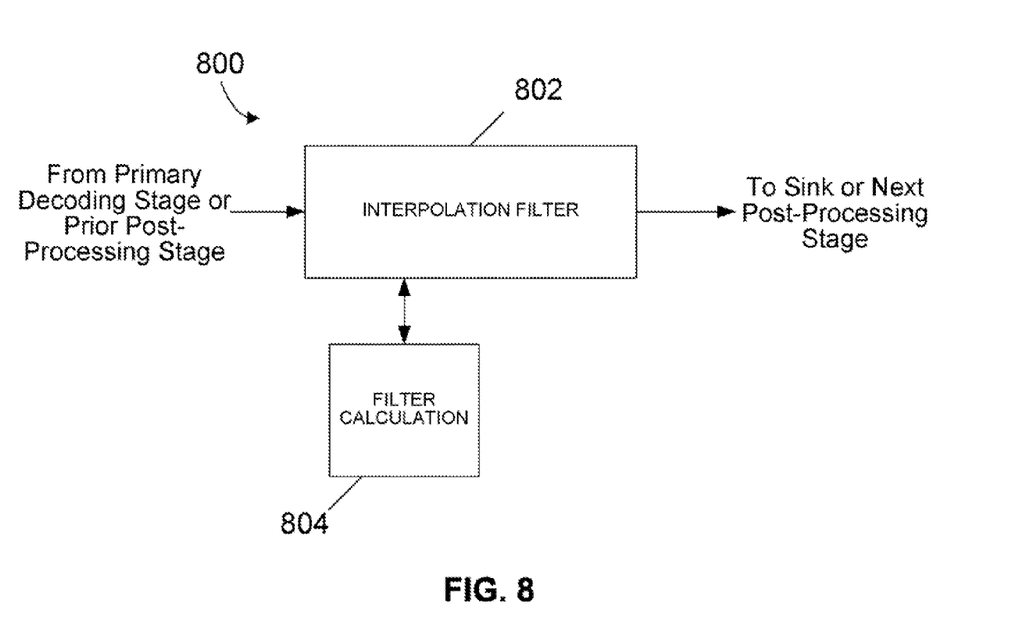
FIG. 8 is a functional block diagram of a temporal scalability stage according to an embodiment of the present invention.

The post-processing stage 308 can include a temporal scalability stage. Temporal scaling often involves the adjustment of a decoded frame rate by adding, dropping or replacing frames. Temporal scaling processes are well known in the art. FIG. 8 is a functional block diagram of a temporal scalability stage 800 according to an embodiment of the present invention. The temporal scalability stage 800 can include an interpolation filter 802 and a filter calculation unit 804. The temporal scalability stage 800 receives decoded video data from either the primary decoding stage of the decoder 300 or a prior post-processing stage. The output of the temporal scalability stage 800 can be provided to the sink 316 or to a next post-processing stage. The constituent components of the temporal scalability stage 800 can each be in communication with the control data received by the decoder 300.

The temporal scalability stage 800 can use the inherent temporal scalability in the decoded bitstream to reduce or increase the frame rate. For example, the temporal scalability stage 800 can remove frames from a decoded bitstream to lower the frame rate and to, in turn, lower power consumption. Alternatively, the temporal scalability stage 800 can create frames to increase the frame rate. Further, temporal scalability stage 800 can replace frames in the decoded bitstream with new frames to improve power consumption. For example, the temporal scalability stage 800 can replace certain non-reference frames with interpolated frames to reduce computational requirements. Further, frames dropped by the encoder can be replaced or interpolated by the temporal scalability stage 800.

The received control data can turn the temporal scalability process on or off. The control data can also specify the type of interpolation to be employed such as, for example, either the adding, replacing or dropping frames. The calculation unit 804 can be used to aid the process of generating new frames, The resource processor 320 can be used to adjust the operation of the temporal salability stage 800. That is, the resource processor 320 can control the temporal scalability of the base decoding unit 318 and/or the temporal scalability stage 800 based on received control data and/or data inherent in the received encoded bitstream. As with the adjustment of the spatial scalability of the decoder 300 by the resource processor 320, the temporal scalability of the decoder 300 and its constituent components (i e., the base decoding unit 318 and the post-processing unit 308) can be adjusted in the absence of inherent temporal scalability information provided in the received encoded bitstream. That is, the temporal scalability of the decoder 300 and its constituent components can be adjusted and managed by the resource processor using received control data and based on the resources available to the decoder 300.

Additional Post-Processing Stages

The post-processing stage 308 can also include a contrast enhancement, a scan mode conversion or an aspect ratio conversion stage.

Control Signaling

As previously mentioned, control signaling can be provided over the same communication channel that carries encoded data from an encoder to a decoder in accordance with an aspect of the present invention. The control signaling can be communicated out-of-band white the received encoded data, or base coded video signal, can be communicated in-band. For example, the control signaling can be interleaved with the encoded data. For implementations involving H.264 decoders, special Network Abstraction Layer (NAL) units or Supplemental Enhancement Information (SEI) messages can be used to deliver messages out-of-band.

The control signaling can assist the decoding processes implemented by the primary decoding stage of the decoder. That is, the control signaling can provide data or information to the primary decoding stage which can reduce the processing or computational burden on the primary stage during the decoding of the base coded video data. For example, in H.264, various internal parameters are derived from the runtime state of the decoder and used during the decoding process. These parameters can be expensive to compute in terms of time and power requirements For many such parameters, received out-of-band information can be used to alleviate this computational burden. For example, boundary strength calculations needed for primary decoding functions can be forwarded to a decoder via out-of-band signaling to reduce computational loads.

The primary decoding stage of a decoder of the present invention can also be aided by control information that specifies the particular group of pixels of a frame that should be filtered. Typically, determining the pixels to filter is an involved computational task. The expense of such tasks can be reduced by sending a coded map to the decoder which specifies where to apply certain filters. Further, motion vector predictors can be encoded and forwarded out-of-band to a decoder of the present invention. In doing so, the burden of deriving motion vector predictors at the decoder can be alleviated.

The control signaling can also be used to control the post-processing stages. For example, the control signaling can select which post-processing stages should be implemented. A one-bit control flag can be used to specify whether or not a particular post-processing function/stage should be implemented. The control signal can also provide data or information to the post-processing stages that can reduce the processing burden of the post-processing stages, thereby allowing a gain in quality to be achieved with reduced computational burden. For example, the out-of-band signaling can specify the amount of filtering required (e.g., the amount of dithering or deblocking needed) on specific areas of a frame. The out-of-band signaling can also be used to convey other decoding instructions to the decoder such as, for example, interpolation instructions specifying when to increase or decrease the frame rate and the amount of any such change.

The control signaling can be safely ignored by the decoder in favor of only decoding the base coded video signal without any further or additional processing. In doping so, a base video signal is provided to a sink. The base coded video signal can be matched to the power and resource limitations of a class of decoders or to a specific decoder. If post-processing functions are used, then any reduction in quality due to bitstream restrictions can be improved by administering the selected post-processing stages.

Overall, the decoder of the present invention can receive any data and information via the control signaling that may aid any portion of the decoding process so that visual output quality and/or decoding performance or efficiency is improved. In an embodiment, a program can be forwarded to the decoder via out-of-band signaling. The program can be executed by the decoder and can be used to improve decoding performance. The information delivered to the decoder can be tailored to the specific decoder if the encoder has information on the capabilities and characteristics of the decoder.

Encoder

Figure 9:
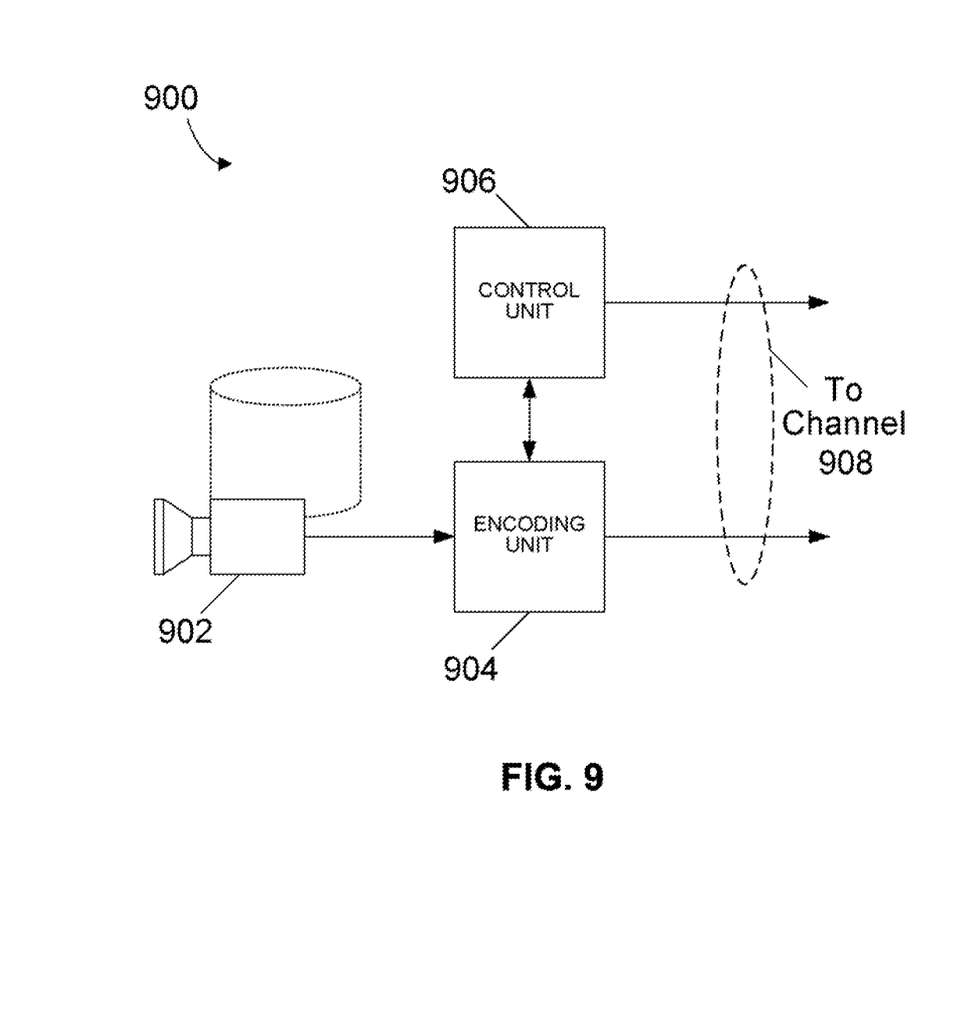
FIG. 9 is a functional block diagram of an encoder according to an embodiment of the present invention.

FIG. 9 is a functional block diagram of an encoder 900 according to an embodiment of the present invention. The encoder 900 can implement an encoding scheme that complements the operation of the decoder 300 of the present invention. The encoder 900 includes an encoding unit 904 and a control unit 906. The encoder 900 can be implemented in hardware, software or some combination thereof. For example, the encoder 900 can be implemented using a computer system. Further, the encoder 900 can implement a variety of video coding protocols such as, for example, any one of the Moving Picture Experts Group (MPEG) standards (e.g., MPEG-1, MPEG-2, or MPEG-4) and/or the International Telecommunication Union (ITU) H.264 standard.

The encoding unit 904 may accept data of a video sequence from the video source device 902, which may be, for example, either a video capture device or a storage device. The encoding unit 904 encodes the video sequence in accordance with instructions or commands received from the control unit 906. Specifically, the encoding unit 904 generates the base coded video signal (as described above) for transmission over a communications channel 908. The base coded video signal is encoded video data that is suitably stripped down for processing across a wide range of decoders having varying capabilities.

The control unit 906 generates the control signal (as described above) to supplement the base coded video signal. The control signal can be generated based on data included in the stripped down base bitstream and can include: (a) data to aid the processing of the base coded video signal by a primary decoding loop of a corresponding decoder; (b) data to flag the post-processing functions that should be or can be implemented to further process a decoded version of the base coded video signal; and/or (c) data to aid the further processing of the decoded base coded video signal by a secondary or post-processing decoding stage of the corresponding decoder. As previously described, the control data can be conveyed to a decoder via out-of-band signaling. The provisioning of the out-of-band data, as well as the in-band data, can be based on the capabilities of a specific decoder.

Conclusion

While various embodiments of the present invention have Men described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A decoder, comprising:
a primary processing stage to decode coded video data from a channel and to obtain decoded video data therefrom, the primary processing stage including a frame buffer to store the decoded video data;
a secondary processing stage to process further the decoded video data from the primary processing stage, wherein said secondary processing stage includes at least one selectable processing function; and
a resource processor to manage operation of the primary and secondary processing stages in response to control information wherein the resource processor selectively enables or disables operations of the secondary processing stage and adjusts operation of the primary processing stage to provide scalable decoder complexity;
wherein the control information is received at the decoder from the channel.

2. The decoder of claim 1, wherein the secondary processing stage includes a deblocking stage.

3. The decoder of claim 1, wherein the secondary processing stage includes a dithering stage.

4. The decoder of claim 1, wherein the secondary processing stage includes a sharpening/edge-enhancement stage.

5. The decoder of claim 1, wherein the secondary processing stage includes a spatial scalability stage.

6. The decoder of claim 1, wherein the secondary processing stage includes a temporal scalability stage.

7. The decoder of claim 1, wherein the secondary processing stage includes a contrast enhancement stage.

8. The decoder of claim 1, wherein the secondary processing stage includes a scan mode conversion stage.

9. The decoder of claim 1, wherein the secondary processing stage includes an aspect ratio conversion stage.

10. The decoder of claim 1, wherein the resource processor selectively enables or disables the secondary processing stage and adjusts operation of the primary processing stage in response to processing resources available at the decoder.

11. The decoder of claim 1, wherein the resource processor selectively enables or disables the secondary processing stage and adjusts operation of the primary processing stage in response to instantaneous operating conditions of the decoder.

12. The decoder of claim 1, further comprising a video sink device to receive processed video data from the secondary processing stage.

13. The decoder of claim 12, wherein the resource processor selectively enables or disables the secondary processing stage and adjusts operation of the primary processing stage in response to a characteristic of the video sink device.

14. The decoder of claim 1, wherein the control data activates or deactivates the secondary processing stage.

15. The decoder of claim 1, wherein the control data includes data to assist the primary processing stage in decoding the coded video data.

16. The decoder of claim 1, wherein the control data includes data to assist the secondary processing stage in processing further the decoded video data from the primary processing stage.

17. The decoder of claim 1, wherein the control data is interleaved with the coded video data.

18. A method for decoding coded data with a decoder, the method comprising:
receiving at the decoder base coded video data from a channel;
receiving at the decoder control information from the channel;
decoding with the decoder the base coded video data to obtain decoded video data therefrom; and
processing further with the decoder the decoded video data to produce an enhanced decoded video data signal,
wherein decoding the base coded video data and processing further the decoded video data is managed by a resource processor in response to control information, wherein the resource processor selectively enables or disables the further processing operations o and adjusts the decoding to provide scalable decoder complexity.

19. The decoding method of claim 18, wherein processing comprises filtering the decoded video data with a deblocking filter.

20. The decoding method of claim 18, wherein processing comprises processing the decoded video data according to a dithering function.

21. The decoding method of claim 18, wherein processing comprises filtering the decoded video data with a sharpening/edge-enhancement filter.

22. The decoding method of claim 18, wherein processing comprises processing the decoded video data according to a spatial scaling function.

23. The decoding method of claim 18, wherein processing comprises processing the decoded video data according to a temporal scaling function.

24. The decoding method of claim 18, wherein processing comprises processing the decoded video data according to a contrast enhancement function.

25. The decoding method of claim 18, wherein processing comprises processing the decoded video data according to a scan mode conversion function.

26. The decoding method of claim 18, wherein processing comprises processing the decoded video data according to an aspect ratio conversion function.

27. The decoding method of claim 18, further comprising adjusting decoding and selectively enabling or disabling further processing in response to instantaneous operating conditions.

28. The decoding method of claim 18, further comprising adjusting decoding and selectively enabling or disabling further processing in response to available processing resources.

29. The decoding method of claim 18, further comprising adjusting decoding and selectively enabling or disabling further processing in response to a characteristic of a video sink device.

30. The decoding method of claim 18, wherein decoding further comprises activating or deactivating further processing based on the control information.

31. The decoding method of claim 18, wherein decoding further comprises decoding the base coded video data based on computational data provided by the control information.

32. The decoding method of claim 18, wherein processing further comprises processing the decoded video data based on computational data provided by the control information.

33. An encoder, comprising:
   an encoding unit to generate base coded video data from a video sequence; and
   a control unit to manage encoding of the video sequence by the encoding unit and to generate a corresponding control signal,
   wherein the control signal is interleaved with the base coded video data, and
   wherein the control signal specifies a post-processing function to enable to decode a version of the base coded video data to produce an enhanced quality video output signal.

34. The encoder of claim 33, wherein the control signal includes computational data to assist decoding of the base coded video data.

35. The encoder of claim 33, wherein the control signal includes computational data to assist post-processing of the decoded version of the base coded video data.

36. An method for coding data with an encoder, the method comprising:
   receiving at an encoder a video sequence from a source;
   encoding with the encoder the video sequence to generate a base coded video signal;
   generating with the encoder a control signal to enable a post-processing operation during decode of a base coded video signal; and
   interleaving with the encoder the base coded video signal with the control signal for transmission over a communication channel.

37. The encoding method of claim 36, wherein generating further comprises generating the control signal to include computational data to assist decoding of the base coded video signal by a primary stage of a decoder.

38. The encoding method of claim 36, wherein generating further comprises generating the control signal to include computational data to assist the scalable post-processing of the decoded base coded video signal by a post-processing stage of a decoder.

39. An encoded video signal created from a method comprising:
   receiving a video sequence from a source;
   encoding the video sequence to generate a base coded video signal;
   generating a control signal to enable a post-processing operation during decode of a base coded video signal; and
   interleaving the base coded video signal with the control signal to form the encoded video signal.

40. The decoder of claim 1 wherein the resource processor selects the at least one selectable processing function to process further the decoded video data based on the control information received from the channel.

41. A scalable decoder for decoding a sequence of video data comprising:
   a base decoding unit to decode coded video data received from a channel;
   a secondary decoding unit to selectively process the decoded video data wherein the secondary decoding unit comprises a plurality of selectable processing functions;
   a processor to receive a control signal and based on the control signal, enable one or more selectable processing functions at the secondary decoding unit to process the decoded video data to provide scalable decoder complexity;
   wherein the control signal is received at the decoder from the channel.

* * * * *